Figure 1:
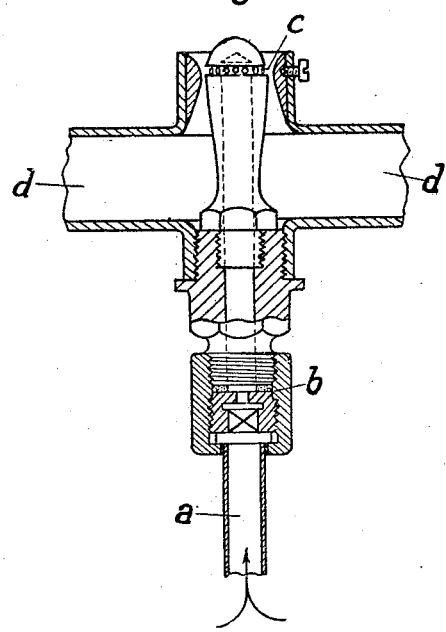

Patented Jan. 26, 1932

1,843,012

UNITED STATES PATENT OFFICE

HANS THEODOR BUCHERER, OF MUNICH, GERMANY

METHOD OF CARRYING OUT CHEMICAL REACTIONS

Application filed September 12, 1928, Serial No. 305,615, and in Germany August 30, 1927.

My invention relates to the art of carrying out chemical reactions and more particularly to an improved way of causing a gaseous substance to react with a liquid or liquefied substance.

It is known that inhalers originally intended for use in treating certain diseases of the throat or, generally speaking, for therapeutical purposes, are also adapted for merely mechanical purposes such as atomizing perfumes and varnishes, vaporizing liquid fuels in connection with combustion engines and the like. The present invention is based upon the idea of using inhalers for carrying out chemical reactions and I have found that the principle embodied by inhaling instruments may be efficiently utilized in quite a variety of chemical reactions wherein gaseous and liquid substances are to be caused to interact or react upon each other, such as gaseous chlorine and liquid organic compounds or oxygen (air) and liquefied sulphur or a gaseous acid and liquid basic substances with a view to combine and form salts and the like.

In order to attain satisfactory results it is imperative in all such cases to calibrate the conduits of the gaseous and liquid substances in a suitable manner, preferably by providing the conduit of the liquid substance with an appropriate calibrating nozzle so that an adequate ratio of or proportion between the flowing spuds of the gaseous substances and the liquid substances will be ensured with a view to obtain a sucking action, just as in the usual therapeutical inhalers, at the enlarged orifice of the liquid conduit due to the gaseous substance flowing in front of the said orifice in a direction perpendicular to the axis of the latter.

The fine distribution or dispersion and the intimate mixture of the gaseous substances and the liquid substances as required for the reaction purpose cannot be attained unless the speed of the gas current is so great as to produce the said sucking action in the vicinity of the orifice of the liquid conduit. It is absolutely immaterial, however, what absolute pressure originally prevails in the said conduit. So far as the velocity of the gas current is of a correspondingly high degree, the fall of pressure in the liquid will be such as to adopt, in the vicinity of the orifice, a pressure below atmospheric by falling from its original high value to atmospheric and down beyond atmospheric, whereby the gas will exercise a direct forwarding action on the liquid substance due to the partial vacuum present.

The gaseous substance may consist of a single element such as chlorine or oxygen, but obviously also a mixture of chemically reacting gases may be employed. In case, however, that chemically indifferent or inert gases are mixed with the chemically active gas or gases, the latter will be attenuated and the reacting effect or power thereof will be reduced which in certain cases may be desirable. A mixture of chemically active gases and indifferent gases, however, will even be advisable and of advantage, provided that the stoichiometric relation of the reacting substances is maintained, for the purpose of imparting to the gas the required pressure or the required flowing velocity, and furthermore for the purpose of utilizing the indifferent or inert gas for causing the fluid constituent or portion to evaporate totally or partially just in accordance with the partial pressure present, that is to say, to exercise a drying effect.

In case of mixtures comprising a liquid constituent and a solid constituent, my invention may also be utilized for merely mechanical objects such as forwarding purposes, provided that a sufficiently high pressure is available in order to impart to the mixture the required flowing velocity. The gas current of correspondingly high intensity will act to vaporize the mixture to such a degree and to forward on the same in a manner that the invention or method affords a feasibility of dispensing with a pump in cases where the otherwise usually applicable devices cannot at all be applied, for instance, due to high temperatures required or the chemical action of the liquid and solid constituents.

In view of the foregoing a detailed description of the method is deemed unnecessary and is therefore omitted in the interest of brevity. For the operations to be carried out in practically performing the invention are obvious to persons skilled in the art. It will be evident, however, that my invention, while still being adhered to in its main essentials, may be varied and adapted in many ways, according to requirements desired or most suitable under different circumstances.

Figure 2:
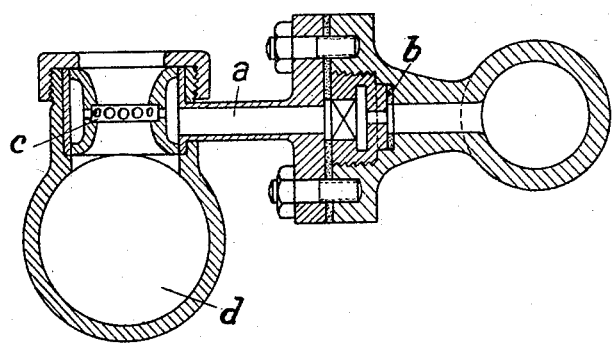

In the accompanying drawings forming a part of the specification I have shown, for purposes of exemplification, an apparatus for carrying the method into effect, in which, Figure 1 shows a cross-sectional view of one embodiment, and Figure 2 a modified embodiment of the same also in cross-section.

In both embodiments, the conduits $a$ for the liquid, which have a comparatively large cross-sectional area, are provided with a detachable calibrating nozzle $b$ located a certain distance remote from the orifice thereof and by which the amount of the liquid flowing therethrough can be controlled in accordance with the requirements of the case, in order to ensure the necessary correct proportion between the liquid and the gas, whence follows obviously that the cross-sectional area of the said nozzle will be, other things being equal, the smaller, the greater is the difference in pressure between the two ends of the conduit. Owing to the pressure of the calibrating nozzle in the conduit, the outlet openings $c$ may be given, independently of the amount of liquid to be supplied, a cross-sectional area of any desired size as commonly required in order to ensure an efficient mixture of gas and liquid.

The openings $c$ as shown in Figures 1 and 2 may be arranged in two different ways just as the liquid emanates from the center towards the periphery, as in Figure 1, or from the periphery towards the center, as in Figure 2, while the gas supplied by the conduits $d$, will act to exercise, in both cases, perpendicularly to the flowing direction of the emitted liquid jet—conveyed peripherally in Figure 1 and centrally in Figure 2—an atomizer-like or inhaler-like action on the liquid so as to atomize the liquid and to exert at the same time a promoting influence on the movement of the liquid as is known from the common inhaler or atomizer.

What I claim is:—

1. A method of performing chemical reactions consisting in causing a gaseous substance, capable of chemically reacting with a liquid, to pass over the orifice of a conduit in a direction other than that of the axis of the said orifice, exposing said liquid to reaction with the said gaseous substance at such a velocity that the gas current will act to both vaporize or atomize and also forward the liquid substance or portion, an adjustment of the cross-section of the gas conduit and of the liquid conduit corresponding in each single case to the pressure conditions being provided for ensuring an adequate relation between the flowing velocities in order to comply with the mechanical requirements and the stoichiometric relation of the reacting substances.

2. A method of performing chemical reactions according to claim 1, wherein the liquid substance or portion of the reacting materials is subjected to any desired or required pressure, and the pressure in the gas conduit is correspondingly increased to so high a degree as to produce, in the vicinity of the orifice of the liquid conduit, a sucking action adapted to forward the liquid substance, notwithstanding the high flow velocity of the liquid substance.

3. A method of performing chemical reactions according to claim 1, wherein the gaseous substance or portion is mixed with any suitable gases which are indifferent or inert as regards the chemical reaction aimed at, for the purpose of ensuring, at the same time, besides the said chemical reaction certain mechanical effects such as evaporation of the liquid substance and similar effects.

In testimony whereof I affix my signature.

HANS THEODOR BUCHERER.